US012399463B2

(12) United States Patent
Willemin et al.

(10) Patent No.: US 12,399,463 B2
(45) Date of Patent: Aug. 26, 2025

(54) TIMEPIECE COMPRISING AN EXTERNAL ELEMENT PROVIDED WITH A ZIRCONIA PORTION

(71) Applicant: The Swatch Group Research and Development Ltd, Marin (CH)

(72) Inventors: Michel Willemin, Prêles (CH); Loïc Curchod, Lausanne (CH); Pierpasquale Tortora, Neuchâtel (CH); Simon Springer, Berne (CH); Cédric Faure, Cortaillod (CH)

(73) Assignee: The Swatch Group Research and Development Ltd, Marin (CH)

( * ) Notice: Subject to any disclaimer, the term of this patent is extended or adjusted under 35 U.S.C. 154(b) by 161 days.

(21) Appl. No.: 17/747,483

(22) Filed: May 18, 2022

(65) Prior Publication Data

US 2022/0390900 A1 Dec. 8, 2022

(30) Foreign Application Priority Data

Jun. 8, 2021 (EP) .................................... 21178160

(51) Int. Cl.
*G04B 45/00* (2006.01)
*G04B 37/22* (2006.01)
*G04B 47/06* (2006.01)

(52) U.S. Cl.
CPC ....... *G04B 45/0015* (2013.01); *G04B 37/225* (2013.01); *G04B 47/06* (2013.01)

(58) Field of Classification Search
None
See application file for complete search history.

(56) References Cited

U.S. PATENT DOCUMENTS 4,993,005 A * 2/1991 Watanabe ............ G04B 19/305 368/226
6,052,338 A 4/2000 Shevins
2001/0040315 A1* 11/2001 Verdon .................. C04B 41/87 264/430
2012/0082012 A1 4/2012 Blanckaert et al.
(Continued)

FOREIGN PATENT DOCUMENTS

CH 705 956 B1 7/2013
CH 713 609 A2 9/2018
(Continued)

OTHER PUBLICATIONS

Translation of JP2011057530, Espacenet (Year: 2011).*
European Search Report of EP 21 17 8160 date Nov. 1, 2021.

*Primary Examiner* — Renee S Luebke
*Assistant Examiner* — Matthew Daniel Hwang
(74) *Attorney, Agent, or Firm* — Sughrue Mion, PLLC

(57) ABSTRACT

Provided is a timepiece including, in addition to a crystal, the following external elements: a back (2), a middle part (1), a dial (3), and two bracelet strands (30), at least one of these external elements includes a body formed of a first portion made of a first opaque material and of a second portion made of a second partially transparent or translucent material. The first material being integral with the second material and the timepiece also includes at least one light source (10) producing light which passes through the second portion made of a partially transparent or translucent ceramic material comprising zirconia.

20 Claims, 2 Drawing Sheets

(56) References Cited

U.S. PATENT DOCUMENTS

| | | | | |
|---|---|---|---|---|
| 2015/0241848 | A1* | 8/2015 | Willemin | F21V 14/08 362/23.19 |
| 2019/0004481 | A1* | 1/2019 | Curchod | C23C 8/36 |
| 2019/0018372 | A1 | 1/2019 | Blanckaert | |
| 2019/0391534 | A1* | 12/2019 | Di Luna | C04B 35/447 |
| 2019/0391535 | A1 | 12/2019 | Berner | |

FOREIGN PATENT DOCUMENTS

| | | | | |
|---|---|---|---|---|
| EP | 1 780 615 | A1 | | 5/2007 |
| EP | 3 588 203 | A1 | | 1/2020 |
| JP | 2000-075053 | A | | 3/2000 |
| JP | 2011057530 | A | * | 3/2011 |
| JP | 2013-501210 | A | | 1/2013 |
| JP | 2019-501388 | A | | 1/2019 |
| JP | 2020-38198 | A | | 3/2020 |
| WO | 2014/053337 | A1 | | 4/2014 |
| WO | 2018/021456 | A1 | | 2/2018 |

* cited by examiner

TIMEPIECE COMPRISING AN EXTERNAL ELEMENT PROVIDED WITH A ZIRCONIA PORTION

CROSS REFERENCE TO RELATED APPLICATIONS

This application is claiming priority based on European Patent Application No. 21178160.4 filed on Jun. 8, 2021, the disclosure of which is incorporated herein in its entirely by reference.

TECHNICAL FIELD OF THE INVENTION

The present invention relates to a timepiece comprising at least one external element comprising at least one portion made of a ceramic material. More specifically, the present invention relates to a timepiece having original light effects, for a functional, aesthetic and/or playful purpose. The present invention also relates to a use of such a timepiece to obtain original functional applications of illuminations on the timepiece.

TECHNOLOGICAL BACKGROUND

Creating timepieces such as wristwatches with an improved aesthetic appearance is a constant concern among watch manufacturers and in particular among those responsible for designing the various external elements. It would take too long to list here all the solutions that have been considered to give a timepiece as neat and aesthetic as possible. By way of example only, mention may be made of the technique of engine-turning of the dials, the shape and/or the colour of the appliques of the dial or of the hands or else the addition of precious or semi-precious stones.

The present invention is part of the quest which aims at offering customers watches whose appearance is at once aesthetic, surprising and functional.

In this context it is known, for example from patent document WO 2010/146162 A1, to illuminate a timepiece of which at least one external element includes a portion made of a material that is at least partially transparent or translucent, in particular a ceramic material. The timepiece, typically a watch, includes one or more light sources which allow to illuminate the ceramic material from inside the casing, under the dial, by producing light which passes through the transparent or translucent portion of this ceramic material. The ceramic material portion of the external element can be a part attached to the latter. The lateral periphery of the middle part of the watch, areas around the winding crown and/or the push-buttons, or else optical elements towards the bracelet strands can thus be illuminated. The dial can also be illuminated via selectively semi-transparent areas (appliques) provided on the latter.

However, a disadvantage of this type of timepiece is that it does not offer an optimal light transmission coefficient. Furthermore, when the ceramic material portion of the external element is an insert, the assembly of such an insert on the external element does not allow to guarantee the water-resistance and the stability over time of the timepiece.

SUMMARY OF THE INVENTION

The invention overcomes the disadvantages of the prior art by providing a timepiece that is water-resistant and stable over time, and allows light to escape from the inside of an external element of the timepiece with optimal light transmission, while having original light effects, for a functional, aesthetic and/or playful purpose.

To this end, the present invention relates to a timepiece including, in addition to a crystal, the following external elements: a back, a middle part, a dial, and two bracelet strands, one at least of these external elements comprising a body formed of at least one first portion made of a first opaque material and of at least one second portion made of a second partially transparent or translucent material, said first material being integral with said second material and the timepiece further including at least one light source producing light which passes through said at least one second portion made of a partially transparent or translucent ceramic material comprising zirconia.

The use of zirconia as an at least partially transparent or translucent ceramic material allows to provide a surprising illumination for the timepiece, giving it a precious and more or less diffuse, discreet, soft and pleasant appearance, these features which can be varied practically infinitely according to the desired aesthetic result, which increases the final aesthetic quality of the timepiece. Furthermore, zirconia stabilised in the tetragonal phase by the addition of yttria (Y-TZP for "yttria-stabilised tetragonal zirconia polycrystals") is the technical ceramic which offers both the best mechanical toughness and one of the best light transmission coefficients. Its use in a timepiece to allow light to escape from the inside of an external element of the timepiece therefore allows to provide the latter with a very good light transmission, while allowing original light effects, for a functional, aesthetic and/or playful purpose. The timepiece according to the invention may for example be an electronic, electromechanical and/or mechanical watch, and in particular a sports watch or a watch called "luxury" watch.

Furthermore, the extraction of light through the second zirconia portion of the external element does not require the assembly of various transparent components attached to the external element. Indeed, the second material being integral with the first material together form the entire one-piece body of the external element, which allows to guarantee the water-resistance and the stability over time of this external element and therefore of the timepiece. Thanks to the invention, there is therefore no need to provide specific light paths, machined in the timepiece, and the water-resistance of which would have to be ensured. It is therefore understood that in this configuration the external element includes a ceramic material such as zirconia. This external element is preferably made in one piece comprising the ceramic material of the zirconia type.

Preferably, the composition and the thickness of the second zirconia portion are selected so that the average light transmission coefficient in the visible spectrum has a value of at least 30%, preferably 40% or more.

Particular shapes of the timepiece are discussed below.

Preferably, the zirconia is white zirconia. More preferably, the zirconia is tetragonal zirconia. The zirconia is advantageously doped with alumina pigments, preferably doped with 5% by weight of alumina pigments. This allows the level of translucency of the zirconia to be adjusted to different values depending on the wishes of the manufacturer.

According to a particular technical feature of the invention, said at least one light source comprises a light-emitting diode.

According to another particular technical feature of the invention, said at least one light source is an extended light source, configured to produce continuous or quasi-continuous illumination on the zirconia portion of the external element.

According to a first embodiment of the invention, the light-emitting diode is an organic light-emitting diode evaporated or printed on the external element to be illuminated or on a substrate inserted in or under the external element to be illuminated, said organic light-emitting diode forming the extended light source. This allows to give a predetermined shape to the extended light source, typically, without this being exhaustive or limiting, a number, letter, logo or else text shape.

According to a second embodiment of the invention, the extended light source includes, in addition to the light-emitting diode, a light guide, said light guide being coupled to the light-emitting diode and being capable of diffusing over its entire length the light injected by the light-emitting diode. This allows to obtain continuous illumination at the desired places on the external element, thus providing in particular functional, aesthetic and/or playful applications that are original and limited to these places.

Advantageously, the timepiece further includes an optical shutter or valve mounted on a moving part of the timepiece, the optical shutter or valve being arranged facing said at least one extended light source and being configured to have only one position at which the light emitted by the light source escapes from the inside of the timepiece to the outside of the latter. Thus, this gives the illusion of a point of light which moves continuously on the external element, such an effect being advantageously able to be used in applications aimed for example at displaying a countdown or a luminous chronometer.

According to a particular technical feature of the invention, the second zirconia portion of the external element to be illuminated includes at least one inscription intended to be illuminated by the light coming from the light source.

Preferably, said at least one inscription is made in the second zirconia portion via a method selected from the group consisting of: selective carburisation and/or nitriding of the surface of the zirconia; a variation in the thickness of the zirconia by mechanical or laser engraving; a variation in the density of the zirconia; an opaque or semi-transparent impression on the surface of the zirconia; a structured PVD physical vapour deposition on the surface of the zirconia or inside the zirconia portion; and a combination of two or more of these methods.

Advantageously, when said at least one inscription is made in the zirconia portion via selective carburisation and/or nitriding of the surface of the zirconia, the inscription forms an active conductive structure, of the electrical conduction track or antenna type. Such structures can be highlighted by illumination of the zirconia around these structures, but also be advantageously used to bring the current necessary to the light source to produce the illumination.

Advantageously, said at least one inscription is configured to be invisible in natural light and only become visible once illuminated by the light from the light source. The inscription can for example become visible by appearing in negative on the surface of the zirconia.

Advantageously, said at least one light source is mounted on a moving part of the timepiece, under the external element to be illuminated, for example mounted on a pseudo-hand configured to rotate around the axis of the hands. This allows to obtain a dynamic and particularly aesthetic illumination result, in particular when the external element to be illuminated is the middle part or the bezel of the watch.

Another aspect of the invention relates to a use of a timepiece as described above, wherein the timepiece includes a plurality of light sources disposed in or under the external element comprising said at least one second portion made of a second partially transparent or translucent material, and in that the switching on and off of the light sources are configured in such a way that the timepiece has, on the external element illuminated by the light sources, at least one visual indication of a function specific to the timepiece and/or relating to a measurement of an external parameter or of a parameter relating to the user of the timepiece.

According to a particular technical feature of the invention, the switching on and off of the light sources are configured in such a way that the timepiece has, on the external element illuminated by the light sources, one or more visual indications relating to one or more of the following functions: indication of the hour, minutes and/or date; indication of a timer or a countdown with luminous areas of the external element which light up, respectively go out, as the time elapses; indication of a magnitude measured by the timepiece by colour, rhythm, frequency and/or intensity-modulated illumination on the external element, for example indication of a heart rate, of a temperature, a running pace, a number of steps or else a decibel level; indication of an alarm or reception of notification; indication of an active function for the timepiece; assistance in adjusting the timepiece.

According to another particular technical feature of the invention, the switching on and/or the switching off of the light sources is controlled simultaneously and/or sequentially.

BRIEF DESCRIPTION OF THE FIGURES

The purposes, advantages and features of the timepiece according to the invention will appear better in the following description on the basis of at least one non-limiting embodiment illustrated by the drawings wherein.

DETAILED DESCRIPTION OF THE INVENTION

Figure 1:
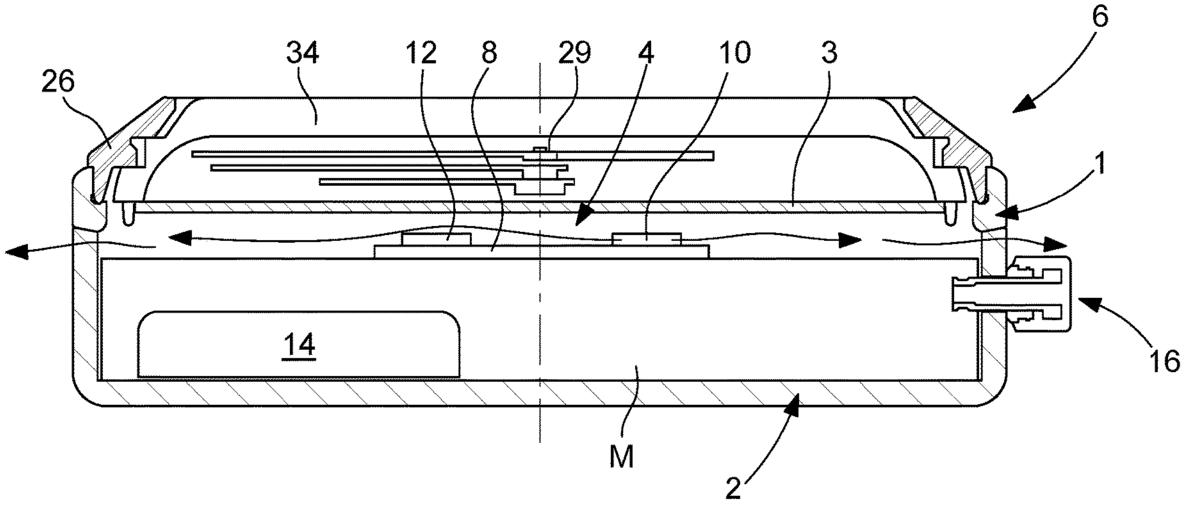
FIG. 1 is a sectional view of a watch case according to one embodiment of the invention, the watch case being equipped with a middle part including a zirconia portion illuminated by a light source.

The present invention proceeds from the inventive general idea which consists in housing at least one light source in or under at least one external element of a timepiece. This external element comprises a body formed of at least one first portion made of a first non-transparent or non-translucent or opaque or substantially opaque material, and of at least one second portion made of a second transparent or translucent or at least partially transparent or at least partially translucent material. In this body, the first material is integral with the second material. The second material consists essentially or exclusively or entirely of a ceramic material such as zirconia. In this configuration, the external element is preferably made in one-piece. It will be understood that the one-piece body of this external element preferably consists only of this said at least one first portion and of this said at least one second portion. In addition, said at least one second portion extends in the thickness of the body of the external element defined between external and internal surfaces of this body. By thus extending in this thickness, this second portion connects these external and internal surfaces to each other.

The first material is preferably present in the body of this external element in a greater proportion than the second material. In this context, this first material can also be called main material and the second material, secondary material. By way of example, the first material can constitute between 60 and 90% of the body of the external element, preferably 75%. It will be noted that the second material is visually identifiable in the external element because it corresponds to said at least one second portion or transparent or translucent area of the body of this external element.

It is understood in this context that the total surface occupied on the external or visible surface of the body of the external element by the second portion(s) is less than the total surface occupied on this same face by the first portions.

However, in other alternatives, this first material may be in smaller proportion than the second material in the body of this external element. By way of example, the first material can then constitute between 20 and 30% of the body of the external element, preferably 25%. It is understood that in this context the total surface occupied on the visible face of the body of the external element by the first portion(s) is less than the total surface occupied on this same face by the second portion(s).

The first material constituting the first portion of the body of this external element is preferably devoid of zirconia. The second material constituting the second portion of the body of the external element which is transparent or translucent comprises the ceramic material including zirconia.

However, in an alternative, the first material of the body of this external element can consist partly or entirely of non-transparent or non-translucent or opaque or substantially opaque zirconia. In this alternative, the second material then consists essentially or exclusively of transparent or translucent zirconia. In this configuration, the body of the external element is entirely made of zirconia.

It will be noted that the second portion is the only portion of the body of the external element which is transparent or translucent. As already mentioned, the body of the external element comprises at least one second transparent or translucent portion. This second portion constitutes a portion of the external element through which the light produced by the light source can escape to the outside of the timepiece.

As seen, in the external element, the first material is integral with the second material. Such a configuration allows to guarantee the water-resistance and the stability over time of the external element and therefore of the timepiece. Moreover, thanks to the invention, there is no need to provide specific light paths, machined in the timepiece, and the water-resistance of which would have to be ensured. This provides a timepiece that is water-resistant and stable over time, with original light effects providing surprising illumination for the timepiece, for functional, aesthetic and/or playful purposes. This allows to give the timepiece a precious and more or less diffuse, discreet, soft and pleasant aspect, these features being able to be varied practically infinitely according to the desired aesthetic result, without requiring the assembly of transparent components attached to the external element.

In the following description, all the portions of the timepiece which are well known to the person skilled in the art will only be explained in a simplified manner.

FIG. 1 is a sectional view of a middle part 1 delimiting with a back 2 and a dial 3 an interior volume 4 of a watch case 6. The watch case 6 is closed on the top by a crystal 34. For the purposes of the present description, it will be imagined that the watch is an electronic watch and that its movement M is disposed in the back of the watch case 6. In this way, it is possible to dispose above the movement M a support plate 8 of the printed circuit board or flexible PCB type on which are mounted a light source 10, for example of the light-emitting diode or LED type, and its electronic control circuit 12. In the particular embodiment of FIG. 1, the light source 10 is disposed in the middle part 1 to be illuminated. According to a variant not shown, the light source 10 is disposed under the external element to be illuminated. More specifically, the light source 10 is disposed directly under an internal surface of the body of the external element to be illuminated while being pressed against this internal surface. This light source can be pressed against a portion of the internal surface comprised in said at least one second portion. Provision can also be made, according to a variant not shown, for the light source 10 to be mounted on a moving part of the timepiece, under the body of the external element to be illuminated. For example, when the external element to be illuminated is a bezel 26 mounted on the middle part 1, the light source 10 can be mounted on a pseudo-hand configured to rotate around the axis of the hands 29.

Any type of light source 10 can be used, whether punctual or extended. When the light source 10 is an extended light source, it produces continuous or quasi-continuous illumination on the considered second transparent or translucent zirconia portion of the external element through which the light will escape from the interior volume 4 of the watch case 6. In the particular embodiment illustrated in FIG. 1, a light-emitting diode is used for the light source 10. The light-emitting diode emits, for example, ultraviolet, violet, blue, white or infrared light in combination with an external element loaded with fluorescent and/or phosphorescent particles. The external element to be illuminated, in this case the zirconia middle part 1 in the particular embodiment of FIG. 1, is loaded at the place(s) where it is desired that the light escapes from the inside of the watch case 6. In this way, the fluorescent and/or phosphorescent particles absorb the radiation emitted by the diode and re-emit a homogeneous visible light. Depending on the type of particles selected, fluorescent and/or phosphorescent, the luminous effect ceases immediately after the light source has been switched off or, on the contrary, continues through the afterglow effect.

Figure 2:
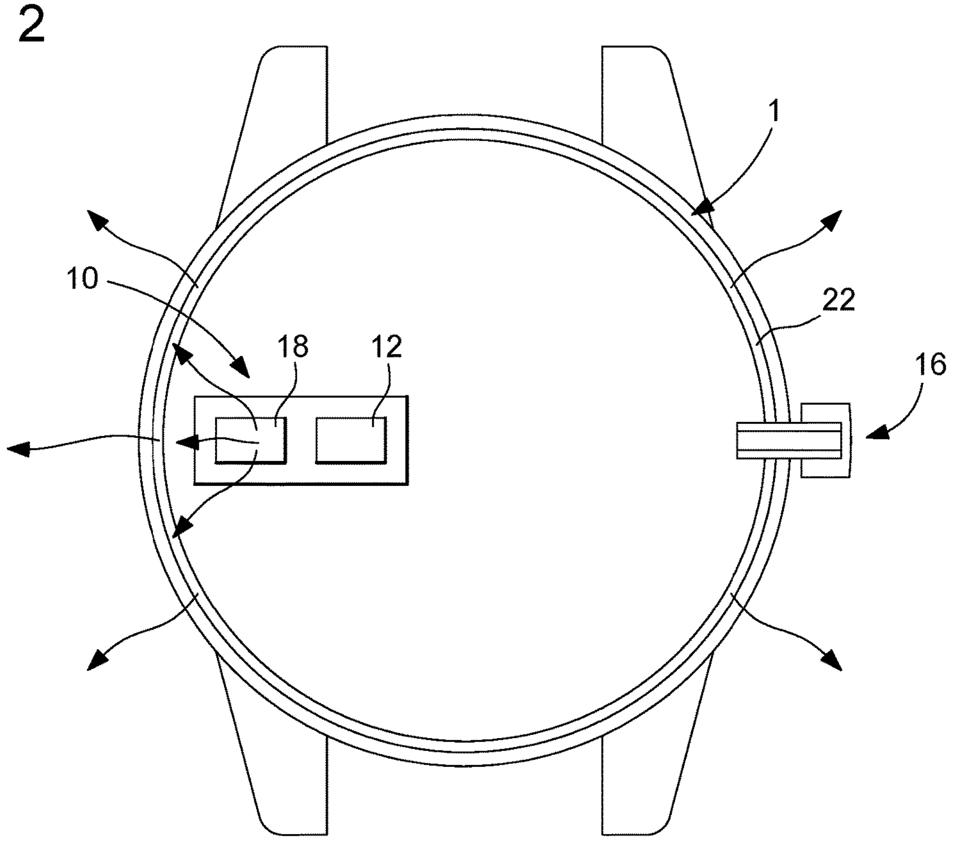
FIG. 2 is a top view of a zirconia watch middle part along the inner side of which is fixed a diffusing optical fibre into which light is injected.

In the particular embodiment illustrated in FIG. 2, the light source 10 is an extended light source which includes a light-emitting diode 18 and a light guide 22. The light-emitting diode 18 is connected to an electronic control circuit 12. The light guide 22 is coupled to the light-emitting diode 18 and is fixed along the inner side of the zirconia middle part 1. The light guide 22 thus allows to bring the light from the point where it is injected into the guide 22 up to the level of the second transparent or translucent zirconia portion(s) of the considered external element(s) through which the light will escape from the interior volume 4 of the watch case 6. According to a variant, the light guide 22 is an optical fibre which allows to bypass any obstacles which may arise between the light-emitting diode 18 and the second transparent or translucent zirconia portion of the considered external element through which the light will escape from the interior volume 4 of the watch case 6. As illustrated in FIG. 2, the optical fibre 22 can be an optical fibre which diffuses the light injected along its entire length. The fact that the optical fibre 22 is coupled to a single light-emitting diode 18 saves costs and energy used to illuminate the second zirconia portion.

In another embodiment not shown in the figures, the light source 10 is an extended light source consisting of an organic light-emitting diode evaporated or printed on the external element to be illuminated or on an inserted substrate in or under the external element to be illuminated. By way of example, the organic light-emitting diode is evaporated or printed on the portion of the internal surface of the body of the external element which is comprised in the second portion to be illuminated or on a substrate inserted in or directly under this portion.

In another embodiment not shown in the figures, the light source 10 is an extended light source having the shape of a number, letter, logo or text.

The light source 10 is power supplied for example by a rechargeable or interchangeable battery 14 and conventionally disposed under the watch movement M on the side of the back 2 of the watch case 6. It will be understood that the watch according to the invention can be electronic, electromechanical or even purely mechanical. In the latter case, it will be sufficient to provide a housing to receive a battery which will be intended to power supply only the light source 10 and its electronic control circuit 12. Thus, the present invention can be applied to any type of wristwatch, the only constraint to be observed being that there is no obstacle to the propagation of light between the light source and the external element through which said light must exit.

Until now, the present invention has been described in connection with the middle part 1 as the only external element made of the first material integral with the second material comprising at least partially transparent or translucent zirconia. The present invention is however applicable to any other external element of a timepiece whose body consists of the second zirconia material which is at least partially transparent or translucent such as for example the dial 3 (visible in FIG. 3), the back 2, the bezel 26, a flange (not shown in the figures), or else bracelet strands 30 (visible in FIG. 4). According to a particular exemplary embodiment, the second zirconia material constituting the second portion(s) of this body of the external element intended to be illuminated, is comprised in an upper portion of the middle part 1 or of the bezel 26. According to another particular embodiment, the second zirconia material constituting this body of the external element intended to be illuminated is a second portion of a control member of the watch such as a push-button 16, or a second portion of a winding crown, optionally provided with a crown cap. In this case, the winding crown and/or the crown cap comprises at least one second portion made of this second material which is at least partially transparent or translucent.

Figure 3:
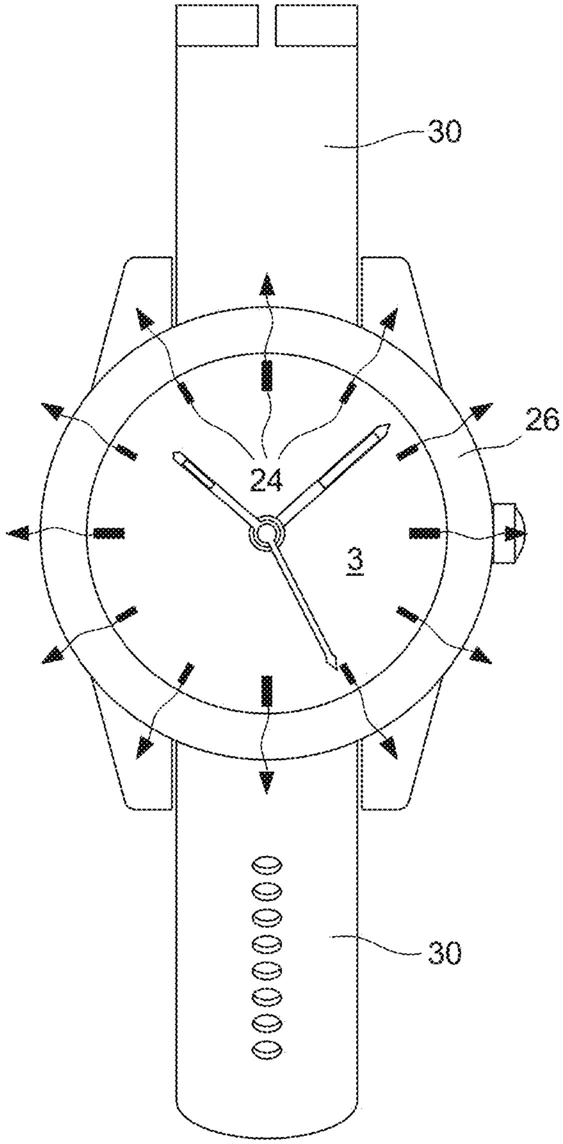
FIG. 3 is a top view of a wristwatch comprising a dial and/or a zirconia bezel through which light passes.

Another particular embodiment is illustrated in FIG. 3, where the timepiece is a wristwatch. In this embodiment, it is possible, for example, to illuminate appliques 24 at the bezel 26 and the dial 3. To this end, the bezel 26 and the dial 3 can each be provided with a first totally opaque part and let the light escape only at the appliques 24, the latter being the second portions of the body of this external element made of the second material of transparent or translucent zirconia. In this configuration, the body of each of these external elements is proportionally made of a greater amount of first material than of second material. Conversely, the appliques 24 of the bezel 26 and/or the dial 3 can be made of the first opaque material and the rest of the body of each of these external elements is made of the second material of transparent or translucent zirconia. In this configuration, the body of each of these external elements comprises proportionally more second material than first material. In this particular embodiment illustrated in FIG. 3, the wristwatch may for example include several punctual light sources, more specifically as many punctual light sources as there are appliques 24 (twelve in the example illustrated). Each punctual light source is then provided to directly or indirectly illuminate one of the appliques 24. The wristwatch may alternatively include a single extended light source, typically an extended light source similar to that illustrated in FIG. 2, including a light-emitting diode and a light guide coupled to the diode. The light guide can then be provided to extend under the dial 3 to be illuminated, substantially opposite the periphery of the dial 3 and therefore of the appliques 24.

Figure 4:
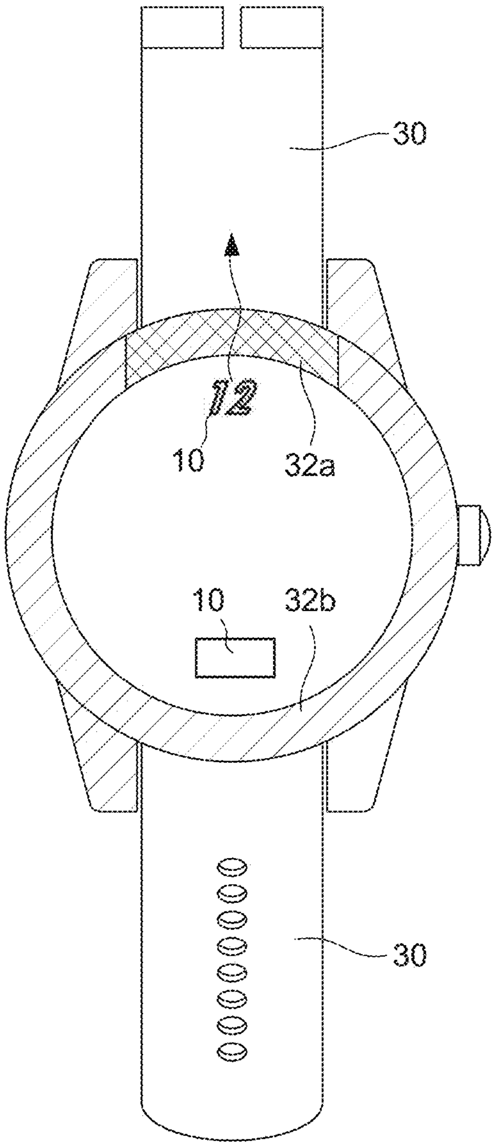
FIG. 4 is a top view of a wristwatch comprising two bracelet strands wherein the light diffuses by means of two zirconia portions provided in the middle part.

In another particular embodiment illustrated in FIG. 4, the light produced by the light source 10 is injected into the strands 30 of a transparent or translucent bracelet. To this end, provision is made of a middle part 1 which has two second portions made of a second material of transparent or translucent zirconia 32*a* and 32*b* substantially at twelve o'clock and at six o'clock, that is to say at the places where the strands 30 of the bracelet are fixed to said middle part 1. On the inner side of the watch case 6, two light sources 10 can each be provided facing one of the two second zirconia portions 32*a*, 32*b* of the middle part 1. The light produced by the two light sources 10 emerges from the watch case 6 through said two second portions made of the second material 32*a*, 32*b* and is injected into the two transparent or translucent strands 30 of the bracelet wherein it diffuses.

The external element(s) of the watch which allow all or part of the light produced by the light source to pass can be illuminated directly by this light source. However, these external elements can also be illuminated indirectly by the light source.

Preferably, the second portion of the external element to be illuminated consists of the second white zirconia material. Alternatively, the zirconia may be coloured zirconia. Preferably, the zirconia is tetragonal zirconia. The zirconia is advantageously doped with alumina pigments, preferably doped with 5% by weight of alumina pigments.

Preferably, the composition and the thickness of the second material of the second portion extending in the body of the external element, are selected so that the average light transmission coefficient in the visible spectrum has a value of at least 30%, preferably 40% or more. It will be noted that when the first material of the first portion consists partially or exclusively of non-transparent or non-translucent or opaque or substantially opaque zirconia, the composition and the thickness of the body comprising this material are selected so that the average light transmission coefficient in the visible spectrum is zero.

It is also possible, when the first material is not integral with the second material, that this second material made of at least partially transparent or translucent zirconia to constitute an insert. The zirconia used in this insert is typically white zirconia. The insert is provided at the place(s) where it is desired that the light escapes from the inside of the watch case 6. The rest of the external element is then for example made of the first material.

According to an embodiment of the invention not shown in the figures, when the light source 10 is an extended light source, the timepiece further includes an optical shutter or valve mounted on a moving part of the timepiece. The moving part is for example a hand or a pseudo-hand of the timepiece. The optical shutter or valve is arranged facing the extended light source 10 and is configured to have only one position for which the light emitted by the light source 10 escapes from the inside of the timepiece towards the outside of the latter.

According to another embodiment of the invention, not shown in the figures, the second portion of the external element to be illuminated, made of the second zirconia material, includes at least one inscription intended to be illuminated by the light coming from the light source 10. This inscription is for example made in this second zirconia portion:

- either by selective carburisation and/or nitriding of the surface of the zirconia,
- either by varying the thickness of the zirconia by mechanical or laser engraving (for example a shrinkage of a few 0.1 mm in the ceramic),
- either by variation of the density of the zirconia,
- either by an opaque or semi-transparent imprint inside or on the surface of the zirconia external element,
- or by a physical vapour deposition PVD or the like, structured inside or on the surface of the zirconia portion,
- or by a combination of these methods.

When the light emission from the light source 10 is switched on, the normally invisible inscription appears in negative on the surface of the second zirconia portion.

Preferably, when the inscription is made in the second zirconia portion by selective carburisation and/or nitriding of the surface of this second zirconia portion, the inscription forms an active conductive structure, of the electrical conduction track type or antenna.

The timepiece according to the present invention can advantageously be used to provide various functional applications to a user of the timepiece. To this end, the timepiece includes several light sources 10. Each light source 10 is disposed in or under the external element comprising the second zirconia portion to be illuminated. In particular, each light source 10 can be disposed directly under the portion of the internal surface of the external element comprised in the second zirconia portion to be illuminated. The light source is then positioned by pressing, gluing or by any other type of means on this portion of the internal surface of this external element. The switching on and off of the light sources 10 are configured in such a way that the timepiece has, on the external element illuminated by the light sources 10, at least one visual indication of a function specific to the timepiece and/or relating to a measurement of an external parameter or of a parameter relating to the user of the timepiece. The switching on and/or the switching off of the light sources 10 can be controlled by the electronic control circuit 12 simultaneously and/or sequentially. It will be noted that each light source 10 is switched on and off separately by this electronic control circuit 12.

Among the possible functional applications for the timepiece, mention can for example be made of:

- indication of a magnitude measured by the timepiece by colour, rhythm, frequency, and/or intensity-modulated illumination on the external element. For example:
  - indication of the user's heart rate by pulsed illumination at the same frequency. The colour of the illumination can also be varied according to the frequency, typically green for a low rhythm, then increasingly red the higher the heart rate;
  - indication of the ambient temperature by illumination of the numbers or appliques 24 on the dial 3 in sequences (see FIG. 3), by adapting the colour to the temperature (typically blue for low temperatures, and increasingly red for increasingly higher temperatures);
  - (absolute or relative) indication of running pace for a sports watch;
  - indication of the number of steps or any other measure of the sport activity of the user;
  - indication of a decibel level (for example on a construction site, in a discotheque, etc.);
- indication of any type of alarm and use of different combinations of rhythms/intensities/colours for the different alarms. In this case, many external elements of the timepiece can light up simultaneously or sequentially, including the bracelet. Examples of alarms:
  - alarm clock;
  - reception of a message or an e-mail (or acknowledgment of receipt of a message sent) or any other notification from any other application for a watch connected to a mobile device such as a mobile telephone;
  - acknowledgment of receipt for payment for a watch with contactless payment functionality;
- indication of the active function for a multitasking watch, in particular the function "Time", "Chrono", "Baro" (for the barometer), "Podo" (for the pedometer), etc.:
  - by illumination of a number or applique 24 on the dial 3 corresponding to the function (1=Chrono, 2=Barometer, etc.);
  - by transmission illumination of one or more inscription(s) (for example small texts or logos) printed or engraved inside the watch (typically in the middle part 1 and/or the bezel 26), just below the surface, and which are invisible in the absence of illumination;
- assistance with setting the watch, in particular for touch-sensitive watches whose setting is done without a button/crown, which can make operations less intuitive:
  - indication of the active setting level (or menu) when setting the watch by illumination of the numbers or appliques 24 on the dial 3 and/or small texts and/or hidden logos;
  - illumination of the zirconia crown when it is pulled out to adjust the watch;
  - light guide indicating which button(s) and/or portion(s) of the watch the user can/must touch during the next setting step. The buttons themselves and/or an area around the buttons can be illuminated;
  - light confirmation (for example via two or three pulses of light) to indicate to the user that his setting has been accepted by the watch.

Of course, the above list of functional applications made possible by the timepiece according to the invention is not exhaustive and the person skilled in the art will be able to identify other functional applications.

The invention claimed is:

1. A timepiece including, in addition to a crystal, a middle part and the following elements: a back, a dial, and two bracelet strands, the middle part and at least one of these elements each comprising a body formed of at least one first portion made of a first opaque material devoid of zirconia and of at least one second portion made of a partially transparent or translucent ceramic material comprising zirconia doped with alumina pigments, said first material being integral with said second material and the timepiece further including at least one light source producing light which passes through said at least one second portion, wherein said at least one second portion of each body to be illuminated includes at least one inscription intended to be illuminated by the light coming from the light source.

2. The timepiece according to claim 1, wherein said at least one light source is arranged in or under each body.

3. The timepiece according to claim 1, wherein the arrangement of said at least one light source relative to each body is configured so that most or all of the light produced by said at least one light source passes through said at least one second portion of each body.

4. The timepiece according to claim 1, wherein the zirconia is white zirconia.

5. The timepiece according to claim 1, wherein the zirconia is tetragonal zirconia.

6. The timepiece according to claim 1, wherein the zirconia is doped with 5% by weight of alumina pigments.

7. The timepiece according to claim 1, wherein said at least one light source comprises a light-emitting diode.

8. The timepiece according to claim 1, wherein said at least one light source is an extended light source, configured to produce continuous illumination on said at least one second portion of each body.

9. The timepiece according to claim 1, wherein said at least one light source comprises a light-emitting diode, the light-emitting diode being an organic light-emitting diode evaporated or printed on each body to be illuminated or on a substrate inserted in or under the element to be illuminated, said organic light-emitting diode forming an extended light source.

10. The timepiece according to claim 9, wherein said at least one light source is an extended light source, configured to produce continuous illumination on said at least one second portion of each body, and the extended light source includes, in addition to the light-emitting diode, a light guide, said light guide being coupled to the light-emitting diode and being capable of diffusing, over its entire length, light injected by the light-emitting diode.

11. The timepiece according to claim 1, wherein at least one light source is an extended light source, configured to produce continuous illumination on said at least one second portion of each body, and the at least one extended light source has a predetermined shape including any one of a number, letter, logo or text.

12. The timepiece according to claim 1, further comprising a bezel and/or a push-button and/or a winding crown provided with a crown cap, characterised in that the bezel and/or the winding crown and/or the crown cap and/or the push-button is an element comprising said at least one second portion.

13. The timepiece according to claim 1, wherein said at least one light source emits ultraviolet, violet, blue, white or infrared light and in that the external element to be illuminated is loaded with phosphorescent and/or fluorescent particles at the place(s) where it is desired that the light escapes from the inside of the timepiece.

14. The timepiece according to claim 1, wherein the partially transparent or translucent ceramic material consists entirely of zirconia.

15. A use of a timepiece according to claim 1, wherein the timepiece includes a plurality of light sources disposed in or under the element comprising said at least one second portion, and wherein the use of the timepiece comprises switching on and off of the plurality of light sources such that the timepiece has, on the element illuminated by the plurality of light sources, at least one visual indication of a function specific to the timepiece and/or relating to a measurement of an external parameter or of a parameter relating to a user of the timepiece.

16. The use of a timepiece according to claim 15, wherein the switching on and off of the plurality of light sources produces one or more visual indications relating to one or more of the following functions: indication of the hour, minutes and/or date;

indication of a timer or a countdown with luminous areas of the external element which light up, respectively go out, as the time elapses; indication of a magnitude measured by the timepiece by colour, rhythm, frequency and/or intensity-modulated illumination on the external element, for example indication of a heart rate, of a temperature, a running pace, a number of steps or else a decibel level; indication of an alarm or reception of notification; indication of an active function for the timepiece; assistance in adjusting the timepiece.

17. The use of a timepiece according to claim 15, wherein the switching on and/or the switching off of the plurality of light sources is controlled simultaneously and/or sequentially.

18. A timepiece including, in addition to a crystal, a middle part and the following elements: a back, a dial, and two bracelet strands, the middle part and at least one of these elements each comprising a body formed of at least one first portion made of a first opaque material devoid of zirconia and of at least one second portion made of a partially transparent or translucent ceramic material comprising zirconia doped with alumina pigments, said first material being integral with said second material and the timepiece further including at least one light source producing light which passes through said at least one second portion, wherein said at least one second portion of each body to be illuminated includes at least one inscription intended to be illuminated by the light coming from the light source, and the at least one inscription is made in said at least one second zirconia portion via a method selected from the group consisting of: selective carburisation and/or nitriding of the surface of the zirconia; a variation in the thickness of the zirconia by mechanical or laser engraving; a variation in the density of the zirconia; an opaque or semi-transparent impression on the surface of the zirconia; a structured PVD physical vapour deposition on the surface of the zirconia or inside the zirconia portion; and a combination of two or more of these methods.

19. The timepiece according to claim 18, wherein said at least one inscription is made in said at least one second portion via selective carburisation and/or nitriding of the surface of this second portion, and in that said at least one inscription forms an active conductive structure, of the electrical conduction track or antenna type.

20. The timepiece according to claim 18, wherein said at least one inscription is configured to be invisible in natural light and only become visible once illuminated by the light from the light source.

* * * * *